United States Patent [19]
Totten

[11] Patent Number: 5,132,884
[45] Date of Patent: Jul. 21, 1992

[54] HIGH EFFICIENCY ILLUMINATION SYSTEM

[76] Inventor: Thomas B. Totten, 15 Franklin St., Markham, Ontario, Canada

[21] Appl. No.: 667,581

[22] Filed: Mar. 11, 1991

[51] Int. Cl.⁵ .................................................. F21S 3/14
[52] U.S. Cl. ..................... 362/147; 362/221; 362/225; 362/260; 362/297; 315/254
[58] Field of Search ............... 362/217, 221, 225, 227, 362/260, 297, 346, 147, 148; 315/254

[56] References Cited

U.S. PATENT DOCUMENTS

| | | | |
|---|---|---|---|
| 3,307,072 | 2/1967 | Kurt et al. | 315/254 |
| 4,001,571 | 1/1977 | Martin | 362/225 |
| 4,367,417 | 1/1983 | Casasanta | 362/225 |
| 4,574,222 | 3/1986 | Anderson | 315/254 |
| 4,651,059 | 3/1987 | Nilssen | 362/225 |
| 4,747,027 | 3/1988 | Rieger | 362/346 |
| 4,779,178 | 10/1988 | Spitz | 362/260 |
| 4,796,168 | 1/1989 | Peterson | 362/346 |

Primary Examiner—Richard R. Cole

[57] ABSTRACT

A high efficiency illumination system having lighting fixtures in spaced apart relation, light reflector panels in the lighting fixtures having two side by side central curved portions and two curved side portions on respective sides of the central portions, and the central and side curved portions being angled to one another, lighting tube receptacles in the lighting fixtures to support at least one lighting tube, ballasts for supplying power at the appropriate voltage to the lighting tubes, ballast boxes for containing ballasts separate from the lighting fixtures, heavy duty wiring for supplying power at a first line voltage to the ballast box from a power supply, and, light duty power supply for transmitting power from the ballast box to the lighting fixtures at a second voltage lower than the line voltage, there being a plurality of lighting fixtures connected by respective light duty wiring to a single common ballast box.

7 Claims, 3 Drawing Sheets

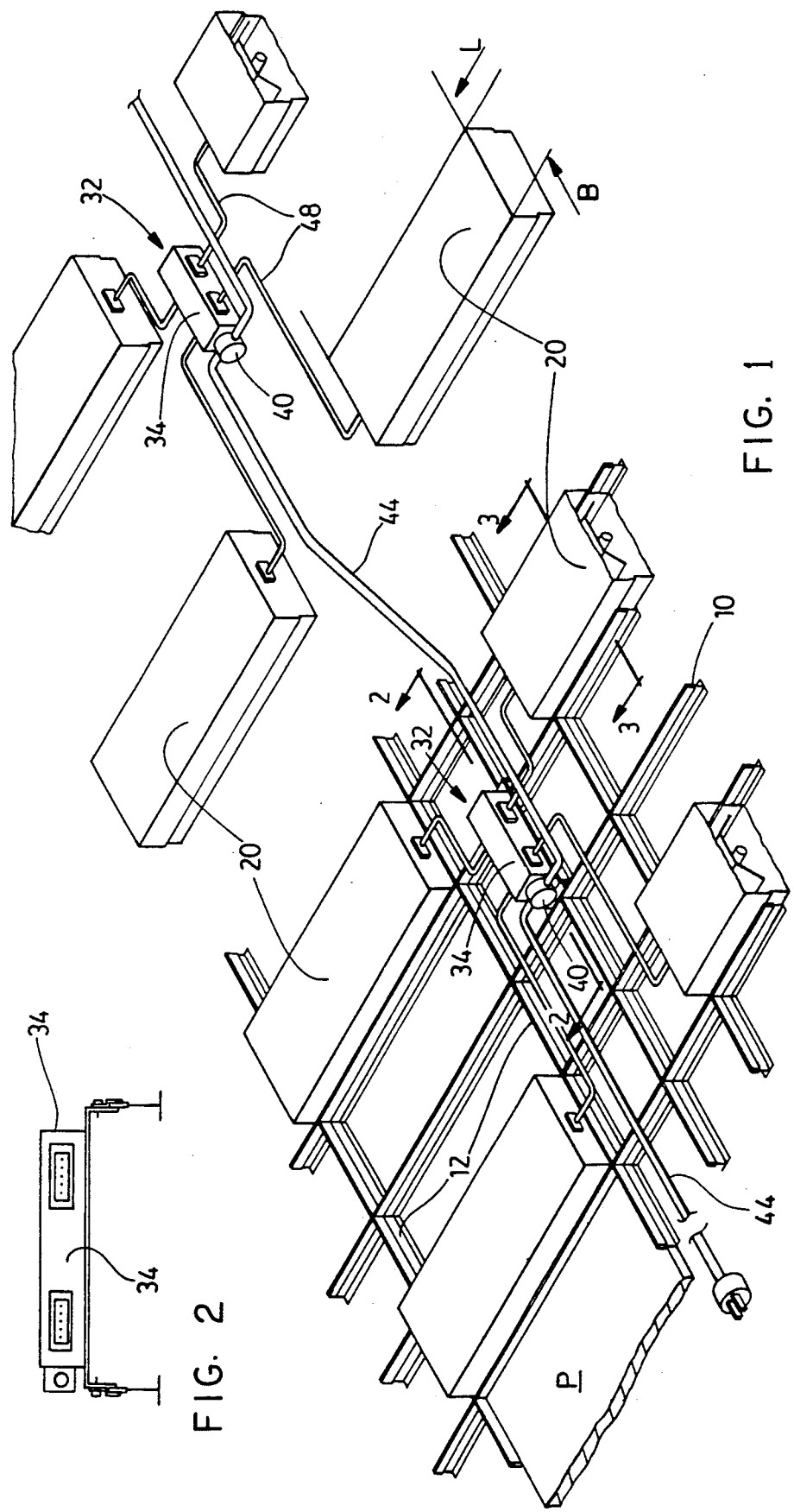

HIGH EFFICIENCY ILLUMINATION SYSTEM

FIELD OF THE INVENTION

The invention relates to illumination systems, and in particular to illumination systems which have a reduced energy consumption, and extended working life.

BACKGROUND OF THE INVENTION

Illumination systems for office and commercial space normally require a certain standard of illumination, at a certain distance from the ceiling. Typically, in office buildings, the standard of illumination required is about 50 foot candles per square foot, at a distance of about six feet below the ceiling i.e., the level of a desk or table. Lighting systems today almost always employ fluorescent lighting tubes, which average approximately forty watts per tube in power consumption. Such lighting tubes are usually supported in rectangular boxes known as lighting troffers. In a large number of office and commercial buildings, such troffers are used in which two such tubes are present. Typically the troffers will be supported on a ceiling frame or grid structure, consisting of ceiling tees, defining a modular dimension of two feet by four feet. Typically the troffers will be two feet by four feet in dimensions, so as to simply rest on the ceiling tees. Depending upon the height of the ceiling and the level of illumination specified in a particular building, such lighting troffers may be provided in a variety of different numerical ratios or proportions, to the number of modules defined by the ceiling grid.

As is well known, such lighting troffers incorporate a so-called "ballast". The ballast is essentially a transformer which is required for reducing the incoming voltage, typically 120 volts, down to the voltage required for the typical lighting tube.

It is well known that such ballasts develop a certain amount of heat during operation. In addition, the lighting tubes themselves also generate heat. Such lighting tubes may be left on at least throughout all the working hours of a day, and in some cases are left on twenty-four hours a day. The heat generated within each troffer is usually simply dissipated within the ceiling space, above the ceiling grid.

It is also well known however, that the generation of such heat both by the tubes and by the ballast, tends to reduce the working life of both the tubes and the ballast. Certain forms of troffers in fact, provide for air circulation openings in order to disperse the heat away from the lighting troffer more rapidly.

The replacement of tubes and ballasts, as well as of course, the consumption of power to operate the lighting tubes themselves, therefore represents a significant cost in the operation of a building. The replacement of the ballasts in particular is a tiresome procedure, and occupies significant man-hours of time on behalf of maintenance personnel in a building.

In addition to all of these factors, the industry commonly arranges the wiring of such lighting troffers whereby one troffer is wired directly to the supply panel, carrying power from the power source. Adjacent lighting troffers are then wired back from the troffer connected to the power source, several troffers may be wired one after the other in this way. This system is well understood, and has been employed satisfactorily. However, it does impose certain restrictions on the type of wiring that may be used. Thus, depending upon the number of troffers that can be wired together, to a single power source, the cable from the original troffer to the power source, and all of the cables connecting to the connected troffer S, must all be of sufficient capacity to carry the voltage and current required to each of the troffers. In the vast majority of systems, the voltage supplied is the standard line voltage i.e. about 120 volts. In order to accommodate the wiring of several troffers together, to a single power troffer, it has been customary to employ a relatively heavy-duty wiring, typically number twelve gauge wiring, has been used throughout. Within each troffer however, since the effect of the ballast is to reduce the voltage supplied to the tubes themselves, wiring of a much lesser capacity may be employed.

At one time, it was the custom for electricians to actually run the wires from the panel to the first troffer and then connect to the connected troffers, simply using standard electrical connections consisting of baring the end of an electrical wire, bending it into a loop and fitting it around a screw. More recently, however, in order to reduce the man hours of trade persons involved at the actual building site, troffers have been made with plug-in connection systems, and wiring harnesses have been prepared in the factory, with plugs to connect to the various troffers. This system increases the factory labor input but decreases the on site trades person input, and thus in fact produces a net saving which is significant. However, since all of the wiring has to be heavy duty wiring, typically number twelve gauge wiring, the plugs have also had to be designed and specified to the same power requirements. This factor has tended to somewhat reduce the actual potential savings involved in the use of plug-in wiring harnesses.

As mentioned, all of these factors have been industry standard for many years. However, recent developments in the design and manufacture of the lighting tubes themselves, have resulted in the production of lighting tubes giving a somewhat more efficient lighting output, for the same expenditure of electrical energy. Since the illumination specifications in the majority of buildings have not materially changed over the years, it is clear that using the new tubes, illumination specifications equal to those previously required, can now be achieved, with a somewhat reduced power consumption.

Some slight advantage can be obtained simply by re-lamping existing troffers with the new lighting tubes, and a slightly greater lighting output would be achieved, than the same troffer using two of the old tubes. This factor would then mean that a slightly lower numerical ratio of troffers could be used over a given ceiling area. This is not, however, a simple matter of illumination directly below each lighting troffer. As the number of troffers in a given ceiling area is reduced, then the spread of illumination between any two adjacent troffers becomes a critical factor. If two adjacent troffers are spaced too far apart, then the illumination will tend to fall off, at a mid-point between the two troffers, to a point where it is unacceptable and below specifications. Accordingly, the obvious solution of simply replacing the old tubes with new tubes and reducing the number of troffers will produce little, if any advantage, and may result in the production of significant, undesirable variations in illumination from one area to another.

Another factor affected by the design of the new lighting tubes, is the design of the troffers themselves. In the past, the majority of lighting troffers were formed of sheet metal, which was simply painted white, or in some cases, was silvered in some way. Little, if any effort was made to provide any high degree of efficiency in the reflection of the light generated by the tubes. However, the new tubes that are now available, comprise cylindrical tubes, which are of significantly smaller diameter than the old style of tubes. It has now been found by experimentation, that by providing a reflector for each of the these new tubes, having a highly reflective surface, and by optimizing the shape of such reflector, that a significantly greater proportion of the light output of the new tubes can be reflected downwardly from the troffer and thus, provide useful illumination in the space beneath the troffer. This factor is, at least in part, due to the fact that the new tubes, are of lesser diameter than old tubes. This then results in a source of light which more closely approaches a "point" source of light, than did the old style larger diameter tubes. After careful development and testing, it has been found that the shape and reflective surface of a reflector can be optimized by using two pairs of curved reflective surfaces, namely a central pair and two side surfaces, and by placing the new smaller diameter tube as close as possible to the effective focal point of such an optimized reflector, that a significantly greater light output can be obtained, than could be obtained with prior art larger tubes.

A careful study of the situation in view of these factors, reveals that for example in a great many buildings, it will now be possible to obtain adequate lighting, using troffers with single, new, tubes and reflectors, to replace old troffers having two old style tubes. In the same way it becomes possible to use troffers having two of the new tubes and a reflector, to replace old troffers having four of the old tubes. The numerical arrangement of such smaller troffers in a ceiling would still of course, be dependent upon the required illumination at a certain level within the building. The new troffers, using new tubes and reflectors may produce up to fifty percent more illumination, for a given electrical consumption, than the old troffers using old tubes. It is thus, obvious that it will not be adequate to replace each old troffer with two tubes, with a new troffer with a single tube. There will have to be some increase in the number of new troffers holding the new tubes in order to produce the same illumination as was previously achieved using old troffers having the old tubes. However, the substitution of smaller new troffers for larger old troffers, while using the new tubes and reflectors, will produce a lighting plan in a building which will be more flexible and adaptable, and at the same time provide entirely adequate illumination, with, in fact, a less noticeable degree of variation in the space between two adjacent troffers.

However, if it was simply a matter of replacing the old troffers with two tubes with new troffers with a single tube, the greatest efficiencies available would not be achieved. This is because even with a lighting troffer using only a single tube, a ballast is still be required for each troffer. Thus although the troffers are smaller, the fact that a somewhat greater number of new troffers will be required to achieve the same overall lighting intensity, would apparently mean that there will be a greater number of ballasts in any given ceiling. This would tend to mitigate against any significant savings in capital costs in particular, and also in maintenance for replacement costs of burnt-out ballasts and the like.

Similarly, if it were simply a matter of replacing the old lighting troffers, using two old tubes with new lighting troffers using a single new tube, and the same prior art wiring system were used, then the fact that each of the new lighting troffers would have to be connected by means of heavy gauge cable, with or without plug-type harnesses, would again tend to reduce the efficiencies, and increase the cost of changing over to such a new system. In spite of all of these complex factors, the advantages to be gained by the use of the new troffers and tubes will in almost all cases warrant the use of such new troffer and tube illumination systems in new construction. However, there are clearly a very large number of buildings already fitted with illumination systems using the old troffers and tubes and it would be highly desirable if an illumination system could be achieved in which the savings were so significant that they would warrant retrofitting existing buildings with new troffers and tubes.

Provided such an energy efficient illumination system could be achieved at an acceptable capital cost, then there would be a substantial benefit to developers of new buildings, and a significant benefit to the owners and operators and of old and existing buildings.

More significantly, however, there would be a substantial reduction in the demand for electrical power, and this would enable electrical utility authorities to slow down the development of new power generation equipment, and to possibly reduce to a significant degree the energy consumption presently expended on the generation of electricity required for illumination. Utilities will, in many cases, offer rebates to customers to encourage the upgrading of old buildings, in this case.

Clearly, it is desirable to provide an illumination system wherein use may be made of the newer high-efficiency troffers and lighting tubes, and at the same time, reductions may be made in installation costs, and furthermore, reductions may be made in the frequency of tube replacement, and ballast maintenance and the like, with a view to permitting such high-efficiency troffers and lighting tubes to be used both in new construction, and also to show sufficient improvement in efficiencies, so that owners of existing buildings will experience significant savings over time, by retrofitting their buildings with the new troffers and lighting tubes.

BRIEF SUMMARY OF THE INVENTION

With a view to satisfying the various conflicting requirements set out above the invention comprises an energy-efficient illumination system, and comprising lighting fixture means adapted to support sources of illumination, and adapted to be supported in spaced part relation in said building, ballast means for supplying power at the appropriate voltage to said sources, ballast box means for containing said ballast means, said ballast box means being separate from said lighting fixture means, and being adapted for support in said building separately from said lighting fixture means, heavy duty wiring means for supplying power at a first line voltage to said ballast box means from a power supply, and, light duty power supply means for transmitting power from said ballast box means to said lighting fixture means at a second voltage lower than said line voltage, there being a plurality of said lighting fixture means connected by respective light duty wiring means to a single common said ballast box means.

The invention further comprises such a high efficiency illumination system and wherein said lighting fixture means incorporate housing means, reflector means with curved portions defining an effective focal point, and means for supporting a said lighting source in spaced relating to said reflector means, substantially at said effective focal point.

The invention further comprises such a high efficiency illumination system and wherein said reflector means comprises a first pair of generally arcuate central portions and second pair of generally arcuate side portions along the respective free edges of said central portions, said second portions having a radius of curvature greater than said central portions and being generally angled relative to said central portions.

The invention further comprises such a reflector with side flanges extending outwardly from said side arcuate portions.

The various features of novelty which characterize the invention are pointed out with particularity in the claims annexed to and forming a part of this disclosure. For a better understanding of the invention its operating advantages and specific objects attained by its use, reference should be had to the accompanying drawings and descriptive matter in which there are illustrated and described preferred embodiments of the invention.

IN THE DRAWINGS

FIG. 1 is a schematic perspective illustration showing a typical ceiling layout, employing the high-efficiency illumination system in accordance with the invention;

FIG. 2 is a side elevation of the ballast box component of FIG. 1,

DESCRIPTION OF A SPECIFIC EMBODIMENT

Figure 3:
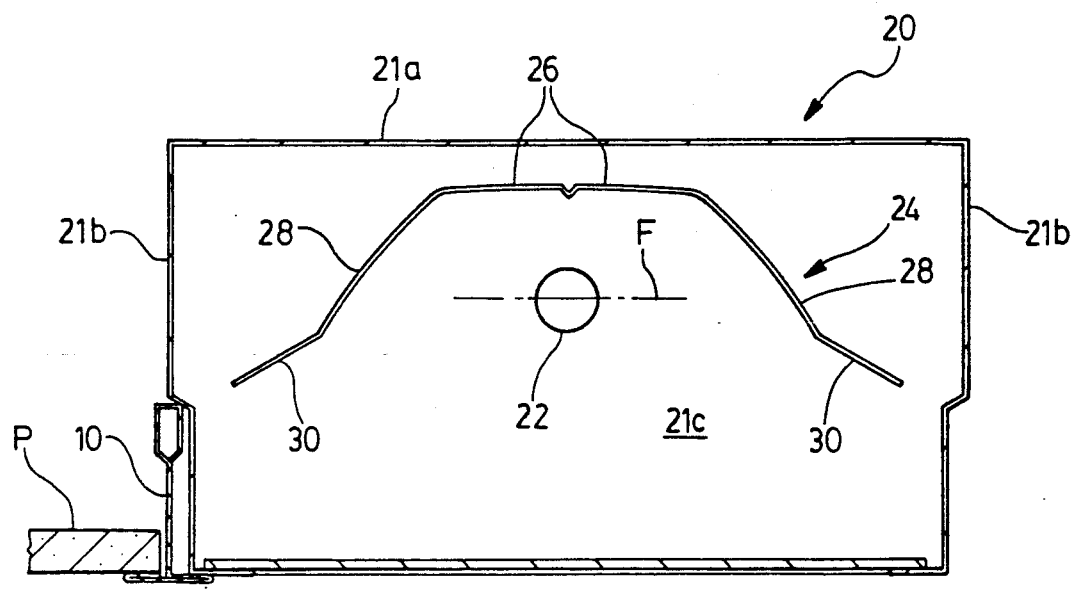
FIG. 3 is a section along the line 3—3 of FIG. 1 of a troffer box component of FIG. 1.

Referring first of all to FIG. 1, a typical ceiling system is indicated, comprising a grid or frame work of longitudinal ceiling tees 10, and transverse ceiling tees 12. Typically such a ceiling or grid will define a standard building module. In a great many buildings, the module is two feet by four feet, although the invention is not in any way restricted to a specific modular size.

In addition, while the invention is illustrated as shown in use in conjunction with a ceiling made up of ceiling tees 10 and 12, it will be appreciated that ceilings of many different forms of construction are available, which do not employ such ceiling tees, and may even simply be formed of drywall, plaster-board or even in some cases wet plaster on lath or the like, all as is well known in the art and requires no description here.

Such ceilings usually employ panels P of acoustic material, which is supported by the ceiling tees 10 and 12, simply laying on the tees.

In the majority of prior art type ceilings, some of the panels P were removed, and were replaced by lighting fixtures known as troffers, which simply rested on the ceiling tees. Usually, the troffers had the same length and breadth dimensions as the acoustic panels P, usually being based upon the ceiling module, which in most cases, but not all, was two feet by four feet. Thus, both the panels P and also the troffers, in such prior art ceilings were two feet by four feet, and were essentially inter-changeable. In this way, the designer of the building could arrange the lighting fixtures in various different positions in the ceiling, so as to provide the required levels of illumination, at various different locations, within the building space.

In accordance with the present illustrated embodiment of the invention, the arrangement of the ceiling grid of ceiling tees 10 and 12 also provides a rectangular grid or framework of whatever dimensions or module is required in the particular building.

Acoustic panels P are provided in the usual way, dimensioned so as to fit within the space defined by the ceiling tees and be supported thereby.

However, in the present invention, lighting troffers 20 are provided, having length and breadth dimensions indicated as L and B (FIG. 1). The length dimension L in this embodiment may conform substantially to the length of the rectangular space defined by the ceiling tees 10 and 12. However, the breadth dimension B, may correspond to something substantially less than the width spacing between two of the longitudinal tees 10, and thereby defining a space S on either side thereof, between either side of the troffer 20, and the adjacent longitudinal ceiling Tee 10.

Reduced size acoustic panels P1, are then provided, having a length and breadth dimension appropriate to fit within the space defined between the troffer and the adjacent ceiling tees, so as to complete the ceiling, adjacent each of the troffers.

However, it will be appreciated that as mentioned above ceilings are of a wide variety of different designs. Where ceiling tees as used they may be arranged so as to provide some spaces which are larger, and some spaces which are smaller, and may be specifically designed to provide smaller spaces to accommodate troffers 20, and larger spaces to accommodate panels P. It will thus be appreciated, that the design of the ceiling may be made more variable, more attractive, and more flexible than was usually the practice in prior art ceilings. In particular, since the troffers 20 of the present invention, are somewhat smaller, and therefore, lighter than the troffers of the prior art, than for example, it may not always be necessary that the troffers 20 of the present invention be supported directly in ceiling tees around all four sides. The troffers define a top wall 21a, side walls 21b and end walls 21c, and the bottom is open.

In accordance with the invention, each of troffers 20 will support, in this embodiment, a single small diameter lighting tube 22, mounted at the central point F of a reflector 24 supported within the troffer 20 (FIG. 3).

The reflector 24 will be seen to comprise a pair of central curved or arcuate portions 26—26, adapted to lie between generally horizontal planes within the troffer 20. On either side of the central portions 26, there are generally curved or arcuate side reflector portions 28—28. The tube 22 lies at a central point F of these arcuate portions 26 and 28 which is deemed herein as the "effective focal" point. Along the free edges of the arcuate portions 28, there are planar reflector flange portions 30—30. Flange portions 30 are angled to flare outwardly relative to portions 28.

The reflector 24 has a highly reflective surface, of what is known as "specular chrome" material. In this way the amount of light reflected by the reflector is maximized, and at the same time as will appear below, the area covered by such illumination from a single tube is optimized, at the desired level in the building.

In accordance with the invention, the central arcuate portions 26—26 have radii of curvature R1, and the side arcuate portions 28—28 have radii of curvature R2. R2 is advantageously greater than R1. Typical values may be for example:

R1=between 5–6 inches
R2=between 6–7 inches

The angle A between tangents of portions 26 and 28 is generally obtuse. Flanges 30 are flared outwardly with regard to side portions 28 and tangents of side portions 28, and flanges 30 define an angle A2.

It will be observed that the angle A1 between tangents of portions 26 and 28 has a first predetermined value, and that the angle A2 between the flanges 30, and tangents of the side portions 28 has a second predetermined value greater than A1.

It will further be observed that the two centres C1—C1 of the central portions 26—26 are spaced apart from one another, substantially equidistant from a vertical plane intersecting the tube 22. It will further be observed that the centres C2—C2 of the side portions 28—28 are spaced apart on either side of the centres C1—C1, and that all of the centres C1—C1 and C2—C2 are located in substantially the same plane, spaced below the tube 22.

A reflector having these configurations and curvatures, in such proportional ranges, is found to provide a high degree of efficiency for a single tube, or for two tubes side by side, so as to maximize the reflection of light downwardly and provide a progressive spread of illumination outwardly from either side of the troffer.

This in turn enables an engineer to design maximum lighting efficiency with a minimum of power consumption, at the levels specified for any particular class of building space, and for a variety of occupations.

Each of the new high efficiency troffers 20, and tubes 22 are adapted to produce approximately fifty percent more lighting output, per unit of electricity, than was produced by prior art lighting troffers and tubes. Thus, a single high efficiency lighting troffer 20 and tube 22, will equal the output of approximately one and one-half of the a single prior art lighting troffers employing two tubes.

It will thus be understood, that in order to produce the same degree of illumination at any desired point within the building, assuming for example that the illumination required in a given space could be provided by ten of the prior art troffers, each having two lighting tubes, then there will be approximately fifteen lighting troffers 20, having reflectors 24 and single lighting tubes 22, provided to replace them. This, however, will not be a disadvantage. What will in fact occur, is that because of the greater number of lighting troffers in a given ceiling area, the degree of variation or "fall-off" of illumination between any two adjacent troffers will be less noticeable, using the new lighting troffers 20 and tubes 22, than was the case with the old style lighting troffers having two tubes.

In accordance with a further feature of the invention, the lighting troffers 20 according to the invention, do not themselves incorporate individual ballasts.

Instead, a separate common ballast 32 is provided, being located in a ballast box 34 supported by means such as brackets 36 on ceiling tees 10 or 12. This box could also be mounted to the slab of the floor above, within the ceiling enclosure. The common ballast 32, is connected by wires 38—38 to groups of lighting troffers 20, so that one such ballast can serve a plurality of such troffers. It will be appreciated, that this is possible because each of the lighting troffers 20 carriers only a single tube, in this particular embodiment of the invention, and thus, for example a prior art ballast, such as is adequate for servicing for example four conventional lighting tubes, will now be adequate for serving at least four separate troffers 20, and possibly more, depending upon the design and specifications of the actual ballast 32 used in the box 34.

Thus, for example it may advantageous to provide a ballast having greater power specifications than were conventional for prior art ballasts, thus, enabling a single ballast to service groups of six or more such lighting troffers 20. In recent years, ballasts have been redesigned, so that instead of being based on simple electrical transformers, they now incorporate electronics. As a result, in spite of having the capacity for handling a greater number of lighting tubes, the actual power consumption of the ballast itself, is greatly reduced. This factor produces two further advantages. In the first place, it reduces the heat generated by the ballast.

In the second place, it reduces the specifications required for wiring the ballast to the main electrical supply. By locating these new high efficiency ballasts in separate ballast boxes, and wiring them separately to groups of various lighting troffers 20, it will be appreciated that the heat generated in the ballast 32 will be dissipated throughout the box 34, which, being separated from the lighting troffers 20, will thus provide for a more efficient dissipation of such heat. Thus, the ballasts will run somewhat cooler, and have a longer useful working life, and so also will the tubes.

The same greater efficiency in heat dissipation is also achieved by using troffers 20 with only a single lighting tube 22 in each troffer, in this embodiment, and without the use of a ballast within each troffer. In this way, the heat of only a single tube is dissipated within the troffer, and this provides a more efficient dissipation of such heat, thereby providing a longer useful working life for such tubes.

This in turn, will reduce the requirement for maintenance and the frequency required for replacement of tubes and ballasts.

In accordance with a further feature of the invention, the ballast boxes 34 are preferably provided with heavy duty input receptacles and plugs 40, and light duty output receptacles and plugs 42. Heavy duty wiring 44, is connected directly to the service panel in the facility, or other power supply (not shown), and thus carries power at the regular service line voltage to the ballast.

However, separate individual light-duty wiring harnesses 48 having light duty plugs 50 thereon carry power from the ballast 32 to each of the lighting troffers 20. Such light-duty harnesses 48 may in most cases be made of much lighter-duty wire than is used for the heavy-duty harness 44, and will also use lighter plugs.

In fact, in practice for example, wire of No. twelve gauge may be used for the heavy duty harness 44, and wire as light as No. eighteen gauge may be used for the light-duty harnesses. In addition, the light duty plugs on the light-duty harnesses will be considerably less costly to manufacture than the heavy-duty plugs used on the heavy-duty power supply harness.

It will thus be seen, that the invention realizes economies in;

(a) the size, and therefore, cost of the troffers;
(b) the electrical power requirements for a given level of illumination within a given space;
(c) dissipation of heat, during the warmer seasons;
(d) replacement and maintenance of tubes and ballasts;

(e) cost of wiring harnesses.

Figure 5:
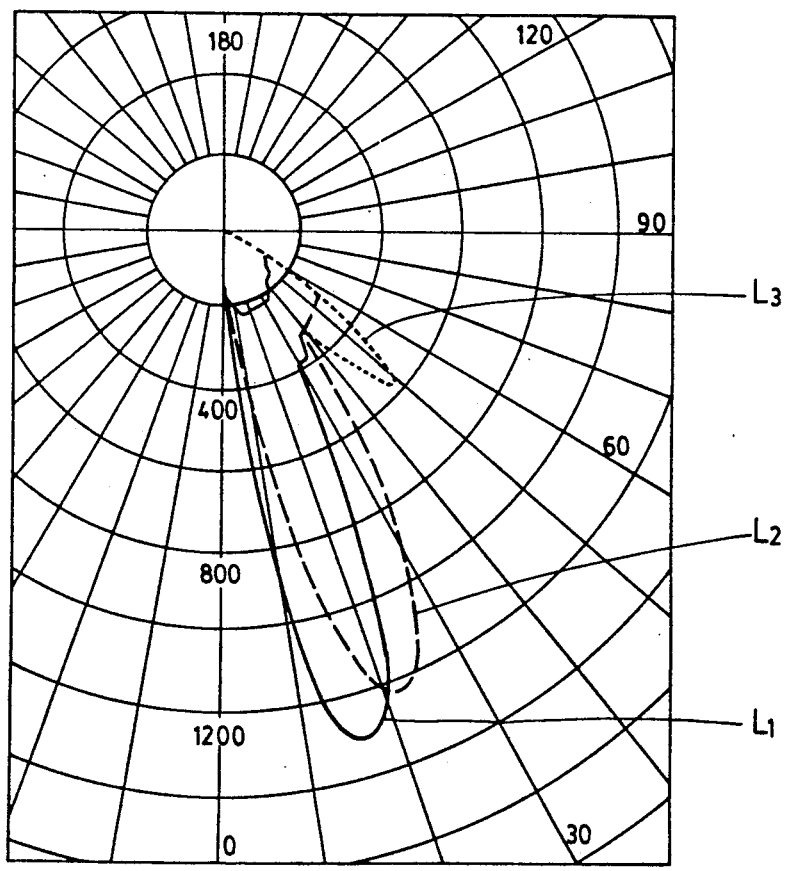
FIG. 5 is a schematic graphic representation of the illumination pattern developed by the illumination system in accordance with FIGS. 1, 2, 3 and 4.
Figure 4:
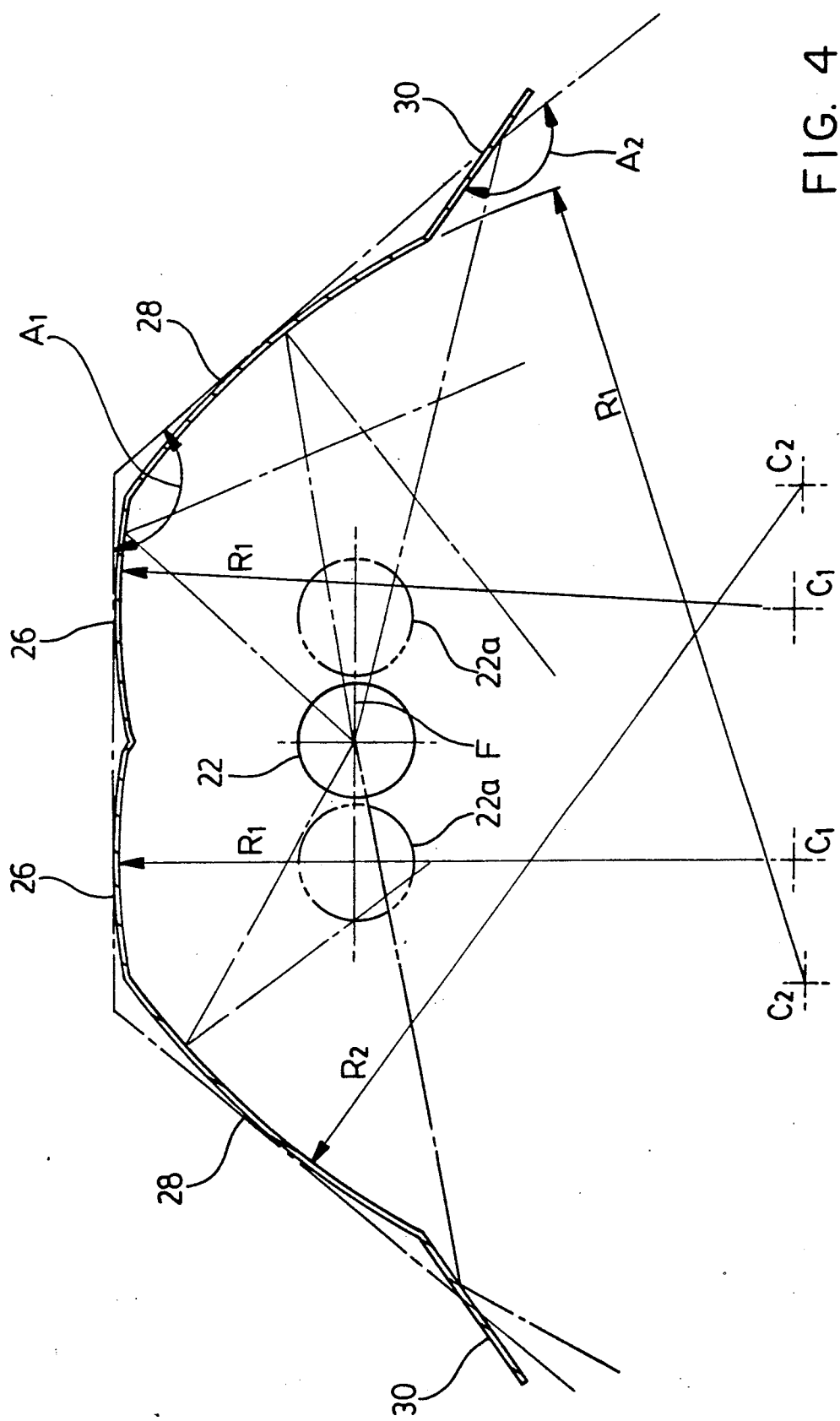
FIG. 4 is an enlarged section of the reflector along line 4—4 of FIG. 1.

By way of example, reference may be made to the following tables A B and C and FIG. 5, showing lighting levels for various types of ceiling, and showing power consumption, from which the economies achieved by the invention will become apparent.

These examples are based on the use of a troffer using only a single tube, and show the advantages over old troffers using two tubes.

The graphic line representing the performance across the troffer is shown by the line L1, and the graphic representation of the performance of the troffer along an axis at an angle of 45 to the troffer is shown by the checked chain dotted line L2, and the performance of the troffer directly along the longitudinal axis of the tube, is shown by the dotted line L3.

TABLE A

| | | CANDLEPOWER SUMMARY | | | | |
|---|---|---|---|---|---|---|
| AN-GLE | ALONG | 22.5 | 45 | 67.5 | ACROSS | OUTPUT LUMENS |
| 0 | 164 | 164 | 164 | 164 | 164 | |
| 5 | 185 | 198 | 236 | 285 | 309 | 27 |
| 10 | 197 | 272 | 491 | 743 | 836 | |
| 15 | 213 | 386 | 901 | 1234 | 1284 | 218 |
| 20 | 206 | 531 | 1198 | 1269 | 1238 | |
| 25 | 202 | 711 | 1176 | 1021 | 814 | 381 |
| 30 | 199 | 864 | 967 | 488 | 401 | |
| 35 | 192 | 897 | 563 | 397 | 372 | 338 |
| 40 | 181 | 807 | 326 | 331 | 325 | |
| 45 | 160 | 644 | 318 | 391 | 460 | 320 |
| 50 | 151 | 423 | 295 | 484 | 567 | |
| 55 | 136 | 232 | 303 | 379 | 347 | 254 |
| 60 | 109 | 155 | 207 | 170 | 152 | |
| 65 | 24 | 55 | 66 | 34 | 29 | 68 |
| 70 | 18 | 19 | 17 | 18 | 14 | |
| 75 | 13 | 11 | 11 | 14 | 8 | 11 |
| 80 | 11 | 6 | 5 | 5 | 8 | |
| 85 | 7 | 4 | 5 | 4 | 4 | 4 |
| 90 | 0 | 0 | 0 | 0 | 0 | |

TABLE B

| ZONAL LUMENS AND PERCENTAGES | | | |
|---|---|---|---|
| ZONE | LUMENS | % LAMP | % LUMINAIRE |
| 0-30 | 626 | 29.12 | 38.61 |
| 0-40 | 964 | 44.86 | 59.47 |
| 0-60 | 1538 | 71.55 | 94.86 |
| 0-90 | 1621 | 75.43 | 100.00 |
| 40-90 | 657 | 30.57 | 40.53 |
| 60-90 | 83 | 3.88 | 5.14 |
| 90-180 | 0 | .00 | .00 |
| 0-180 | 1621 | 75.43 | 100.00 |

EFFICIENCY = 75.4%
SPACING TO MOUNTING HEIGHT RATIO = 2.8 to 1
SPACING CRITERIA LENGTHWISE = 1.7
SPACING CRITERIA WIDTHWISE = 2.8

TABLE C

| LUMINANCE SUMMARY - CD./SQ. M. | | | |
|---|---|---|---|
| ANGLE | ALONG | 45 | ACROSS |
| 45 | 834 | 1670 | 2410 |
| 55 | 872 | 1959 | 2244 |
| 65 | 213 | 575 | 252 |
| 75 | 179 | 157 | 115 |
| 85 | 310 | 217 | 158 |

Corresponding economies are achieved when using a troffer with two tubes as compared with old troffers using four tubes.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A high efficiency illumination system for buildings and comprising;
    lighting fixture means adapted to support sources of illumination and adapted to be supported in spaced apart relation in said building;
    light reflector panel means in said lighting fixture means, and defining two side by side central curved portions and two curved side portions on respective sides of said central portions, and said central and side curved portions being angled to one another whereby to define an effective focal point;
    lighting tube receptacle means in said lighting fixture means and adapted to support at least one lighting tube substantially at said effective focal point;
    ballast means for supplying power at the appropriate voltage to said at least one lighting tube;
    ballast box means for containing said ballast means, said ballast box means being separate from said lighting fixture means, and being adapted for support in said building separately from said lighting fixture means;
    heavy duty wiring means for supplying power at a first line voltage to said ballast box means from a power supply, and,
    light duty power supply means for transmitting power from said ballast box means to said lighting fixture means at a second voltage lower than said line voltage, there being a plurality of said lighting fixture means connected by respective light duty wiring means to a single common said ballast box means.

2. A high efficiency illumination system as claimed in claim 1 and wherein said reflector panel means includes reflector flange portions extending along lower edges of said side portions.

3. A high efficiency illumination system as claimed in claim 1 and further including a first releasable heavy duty electrical connection means on said ballast box means, and second light duty releasable electrical connection means on the said ballast box means, and wherein said heavy duty wiring means incorporates heavy duty electrical interconnection means for interconnection with said first heavy duty electrical connection means, and wherein said light duty power supply means incorporates a light duty interconnection means for interconnection with said light duty connection means on said ballast box means.

4. A high efficiency illumination system as claimed in claim 1 wherein said lighting fixture means comprise generally rectangular shaped troffer box structure, having a top wall, side walls and end walls and an open lower side, said reflector panel means being supported in said troffer box structure, said reflector means comprising, said central portions spaced below said top wall of said troffer box structure, and said curved reflector side portions extending from either said of said central portions and reflector flange portions extending from lower edges of said side portions, and whereby said side portion at least define an effective focal point, edge wall mean formed around said open side of said troffer, said edge all means being adapted to be supportingly engaged by a ceiling structure, and including ballast box support means for supportingly engaging said ceiling structure, at a point spaced from said troffer box structure.

5. A high efficiency illumination system as claimed in claim 1 and wherein a common tangent intersecting said central portions, intersects a tangent central to each of said side portions at a first angle A1 and wherein said tangents of said side portions, and the planes of said flange portions meet at second angles A2, and wherein said angles A2 are greater than said angles A1.

6. A high efficiency illumination system as claimed in claim 5 and wherein said central portions define predetermined radii R1-R1 and wherein said side portions define predetermined equal radii R2-R2, and wherein R2 is greater than R1.

7. A high efficiency illumination system as claimed in claim 6 and wherein said central curved portions define centres which are spaced apart from one another in a plane lying spaced below the axis of said lighting source, and wherein said curved side portions define centres lying spaced apart on either side of said centres of said central portions, and wherein all said centres lie in a substantially common plane, spaced below said lighting tube.

* * * * *